United States Patent Office 2,727,782
Patented Dec. 20, 1955

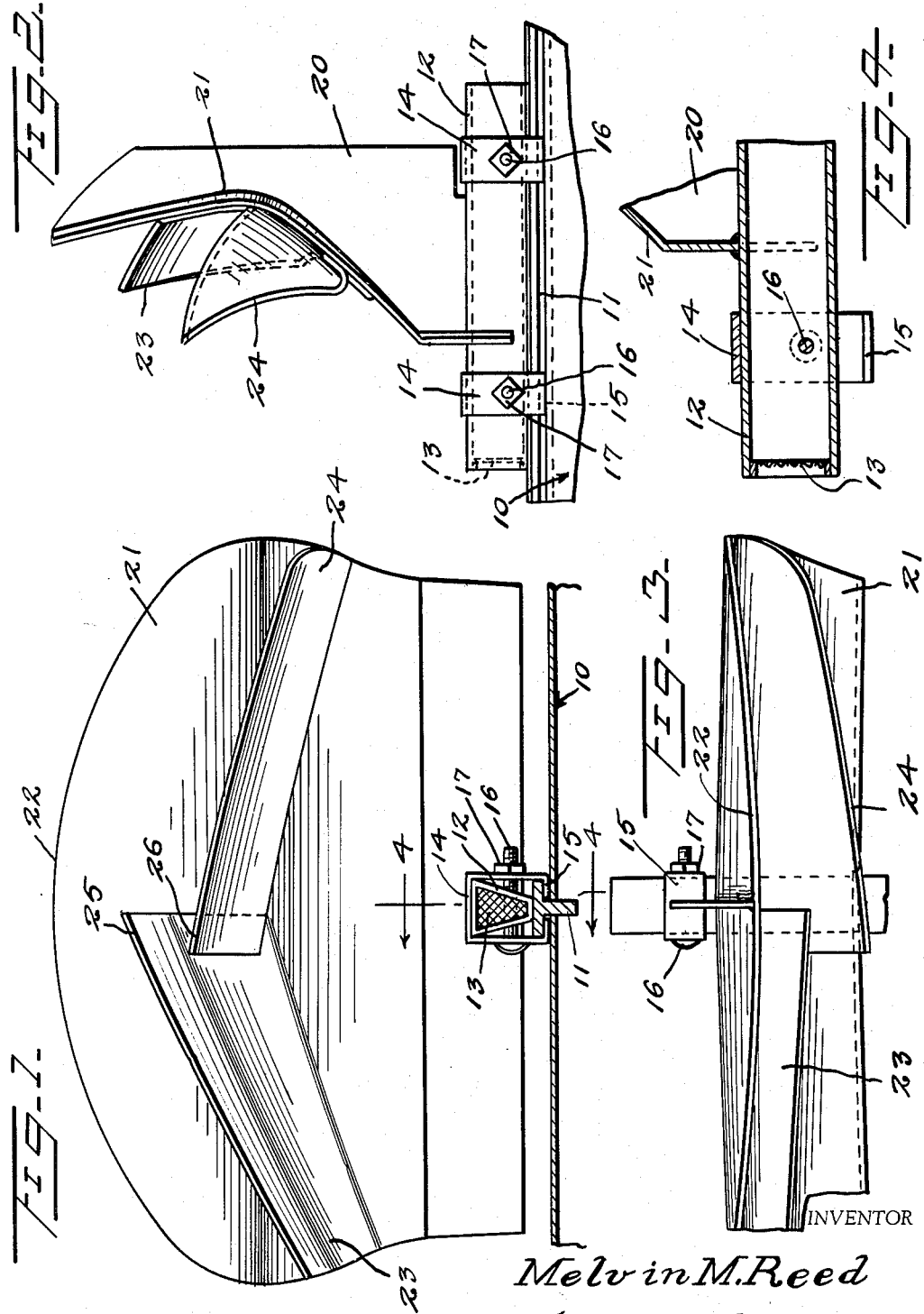

2,727,782

INSECT DEFLECTOR FOR AUTOMOBILES

Melvin M. Reed, Sioux City, Iowa

Application December 29, 1952, Serial No. 328,424

3 Claims. (Cl. 296—91)

This invention relates to an insect deflector and more particularly to such a device adapted to be mounted on the hood of a motor vehicle or the like for deflecting insects and debris from the windshield of the vehicle.

A primary object of this invention is the provision of an improved deflector of this character which will serve to create an air turbulence tending to draw insects into the deflector rather than around the same, as is frequently the case with hitherto known deflectors of this nature.

A further object of the invention is the provision of a device of this character provided with deflector members which will deflect and guide insects and debris downwardly and outwardly toward the sides of the hood of the vehicle and away from the windshield.

Still another object of the invention is the provision of such a device having an air channel through the center of the base thereof for the purpose of creating a mild suction tending to draw insects and debris into engagement with the deflector.

Still other objects reside in a combination of elements, features of construction, and arrangements of parts, all as will be more fully pointed out hereinafter, and shown in the accompanying drawing wherein there is disclosed a preferred embodiment of this inventive concept.

In the drawing—

Figure 1 is a front plan view of one form of device embodying the instant inventive concept, Figure 2 is a side elevational view of the device shown in Figure 1, Figure 3 is a top plan view of the device, Figure 4 is an enlarged sectional view taken substantially along the line 4—4 of Figure 1, as viewed in the direction indicated by the arrows.

Similar reference characters refer to similar parts throughout the several views of the drawing.

Referring now to the drawing in detail, there is generally indicated at 10 a mid-portion of the hood of any conventional motor vehicle, through which is adapted to be secured a longitudinally extending T-shaped member 11. The securing means therefor may take any desired conventional form.

The deflector of the instant invention comprises a longitudinally extending channel member 12 of general quadrangular form, as best seen in Figure 1, and preferably having its smaller dimensions at the bottom. The member 12 is hollow and open-ended to provide an air channel for a purpose to be more fully described hereinafter. A wire screen 13 is secured interiorly of the member 12, adjacent the forward end thereof, to preclude the passage of insects or debris therethrough.

Positioned about member 12 are a pair of substantially U-shaped clamps 14, having inwardly turned flanges 15 at the bottoms thereof, which flanges are adapted to engage under the head of the T-shaped member 11. The U-shaped members 14 are adapted to be clamped by means of screws 16 extending through suitable apertures therein and aligned apertures in the sides of the member 12 and clamped in position by means of nuts 17.

Extending vertically from the center portion of channel member 12 is a longitudinally extending rib 20 having a transverse plate secured to the front portion thereof which is concaved, as best seen in Figure 2, to form a horizontally concaved insect shield 21, provided with an arcuate top as indicated at 22, which serves as a baffle and deflector for insects and debris of all sorts. Extending transversely across shield 21 are a pair of deflector members 23 and 24 respectively. The members 23 and 24 are forwardly rolled or concaved and downwardly and outwardly inclined, the arrangement being such that air striking the lower portion of shield 21 is deflected upwardly by the concavity thereof towards deflector members 23 and 24 and thence forwardly and downwardly to impart an air turbulence to the air stream, which in turn is directed downwardly and outwardly, the air stream thus carrying insects and debris towards the sides of the hood and downwardly and away from the windshield.

The inner end 25 of deflector member 23 extends above and over the corresponding inner end 26 of member 24, allowing an air space therebetween and affording a tortuous path for the passage of air which imparts further turbulence to the air striking the deflector.

Air passing through the channel 12 creates a slight suction which tends to draw insects and debris toward the deflector, while the screen 13 precludes passage of any insects or debris through the channel 12.

The device may be made of any desired material but in practice has been found desirable to use transparent plastic due to its normally unbreakable characteristics and in order not to impair the field of vision of the operator of the vehicle.

From the foregoing it will now be seen that there is provided an improved insect deflector for motor vehicles, which accomplishes all of the objects of this invention and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

What I claim is:

1. In an insect deflector adapted to be mounted on the hood of a motor vehicle, a support, an insect shield carried thereby, a pair of arcuate deflector members carried by said shield, said deflector members being inclined forwardly and upwardly from a vertical plane, the top edges of said deflector members being rolled forwardly, and inclined downwardly and outwardly from the center of said shield, the inner end of the top edge of one member extending above and overlapping the inner end of the top edge of the other member.

2. In an insect deflector adapted to be mounted on the hood of a motor vehicle, a support, an insect shield carried thereby, a pair of arcuate deflector members carried by said shield, said deflector members being inclined forwardly and upwardly from a vertical plane, the top edges of said deflector members being rolled forwardly, and inclined downwardly and outwardly from the center of said shield, the inner end of the top edge of one member extending above and overlapping the inner end of the top edge of the other member, and an air channel extending longitudinally through the base of said support.

3. In an insect deflector adapted to be mounted on the hood of a motor vehicle, a support, an insect shield carried thereby, a pair of arcuate deflector members carried by said shield, said deflector members being inclined forwardly and upwardly from a vertical plane, the top edges of said deflector members being rolled forwardly, and inclined downwardly and outwardly from the center of said shield, the inner end of the top edge of one member extending above and overlapping the inner end of the top edge of the other member, an air channel extending longitudinally through the base of said support, and a screen in said air channel.

References Cited in the file of this patent

UNITED STATES PATENTS

| | | |
|---|---|---|
| 1,071,280 | Van Zile | Aug. 26, 1913 |
| 1,078,765 | Baldwin | Nov. 18, 1913 |
| 1,276,641 | Gallagher | Aug. 20, 1918 |
| 1,445,732 | Vondracek | Feb. 20, 1923 |
| 2,515,604 | Kish | July 18, 1950 |

FOREIGN PATENTS

| | | |
|---|---|---|
| 373,381 | Great Britain | May 26, 1932 |
| 631,078 | France | Sept. 6, 1927 |